Jan. 13, 1942.   F. W. HARTMAN   2,269,909
REFRIGERATING APPARATUS
Filed May 2, 1939   6 Sheets-Sheet 1

INVENTOR
Frank W. Hartman
BY
Warren H. F. Schmidt
ATTORNEY

Jan. 13, 1942.  F. W. HARTMAN  2,269,909
REFRIGERATING APPARATUS
Filed May 2, 1939    6 Sheets-Sheet 2

INVENTOR
Frank W. Hartman
BY
Warren H. F. Schmieding
ATTORNEY

Jan. 13, 1942.          F. W. HARTMAN          2,269,909
                    REFRIGERATING APPARATUS
                      Filed May 2, 1939          6 Sheets-Sheet 6

INVENTOR
Frank W. Hartman
BY
ATTORNEY

Patented Jan. 13, 1942

2,269,909

UNITED STATES PATENT OFFICE 2,269,909

REFRIGERATING APPARATUS

Frank W. Hartman, Detroit, Mich., assignor to Henry Ford Hospital, Detroit, Mich., a corporation of Michigan Application May 2, 1939, Serial No. 271,369

12 Claims. (Cl. 62—140)

This invention relates to air or gas conditioning apparatus, and more particularly to apparatus for supplying oxygen to an enclosure and removing the noxious gases of respiration from the enclosure. Still more particularly, the present invention relates to improvements of my copending application Serial No. 150,594 filed June 26, 1937, now Patent No. 2,220,447, issued Nov. 5, 1940.

One object of the present invention is to provide an apparatus for conditioning gas which apparatus comprises a mixing chamber having an inlet and an outlet for receiving gas from and directing conditioned gas into an adjacent enclosure, such as a tent, and having one or more vessels of liquid oxygen or liquid air, or both, disposed outside of but connected to the chamber so that volatilized gases will flow from the vessels into the chamber and mix with the gas received from the enclosure; a heat conducting member also is provided that extends from the mixing chamber into the liquid or liquids for conducting heat from the incoming gas to the liquid or liquids and to also present a chilled surface on which noxious gases and water vapors in the incoming gas will precipitate and freeze.

A further object of the invention is to provide an air or gas conditioning apparatus comprising a vessel of liquid oxygen and a vessel of liquid air, one vessel being connected to one chamber and the other vessel being connected to a second chamber, each chamber having an outlet into an adjacent enclosure and both chambers having an inlet from the enclosure.

It is desirable to provide a tight seal between the outlet of the liquid containing vessel and the chamber into which it discharges and from which it receives gases. These vessels are relatively heavy. Another object of the present invention is to provide mechanical mechanism for raising and lowering one of these elements with respect to the other. More specifically it is an object to utilize the door of the cabinet which houses the vessel as part of the mechanism for raising and lowering the vessel to register with the opening in the chamber so that the vessel is raised into sealing relation with the opening when the door is closed and is released and lowered when the door is opened.

Other and further objects and advantages will be apparent from the following description, reference being had to the accompanying drawings wherein preferred forms of embodiments of the present invention are clearly shown.

Figure 1:
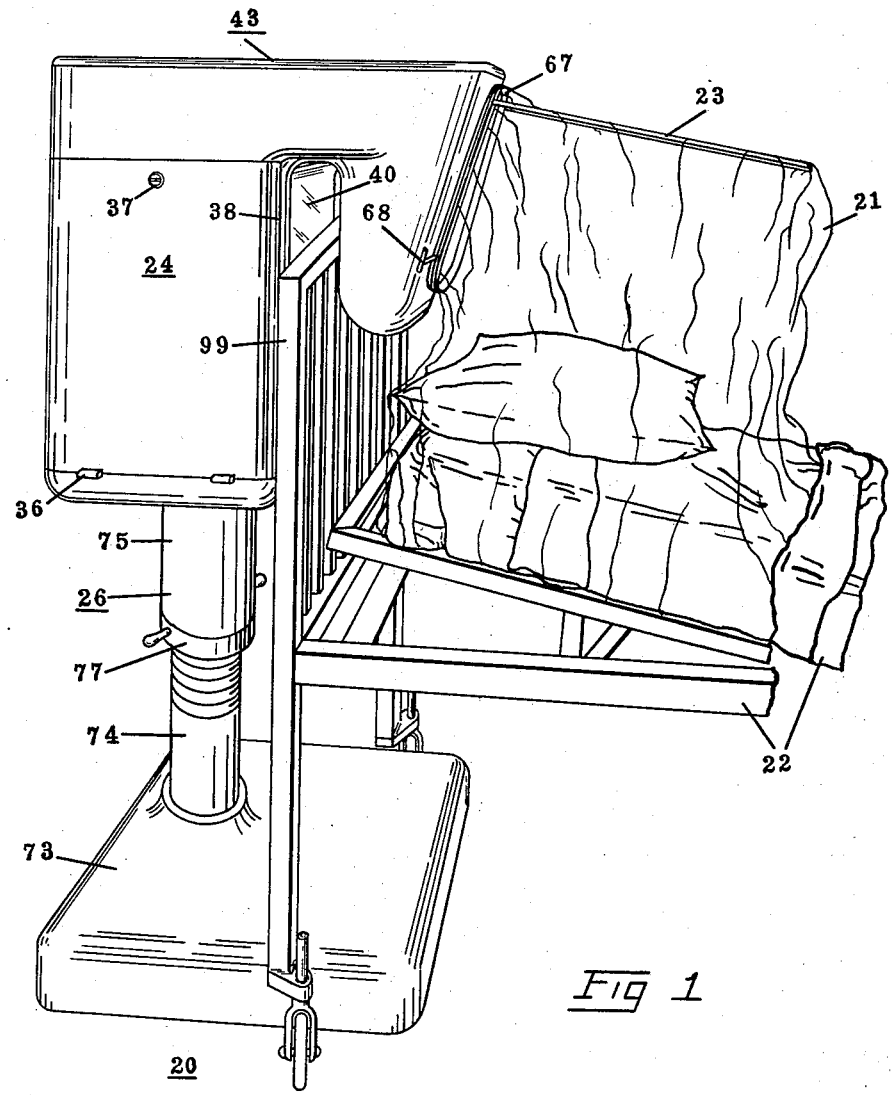
Fig. 1 is a perspective view of an air conditioning apparatus arranged to supply oxygen and cool, purified air to the interior of an oxygen tent that is placed over a bed.
Figure 2:
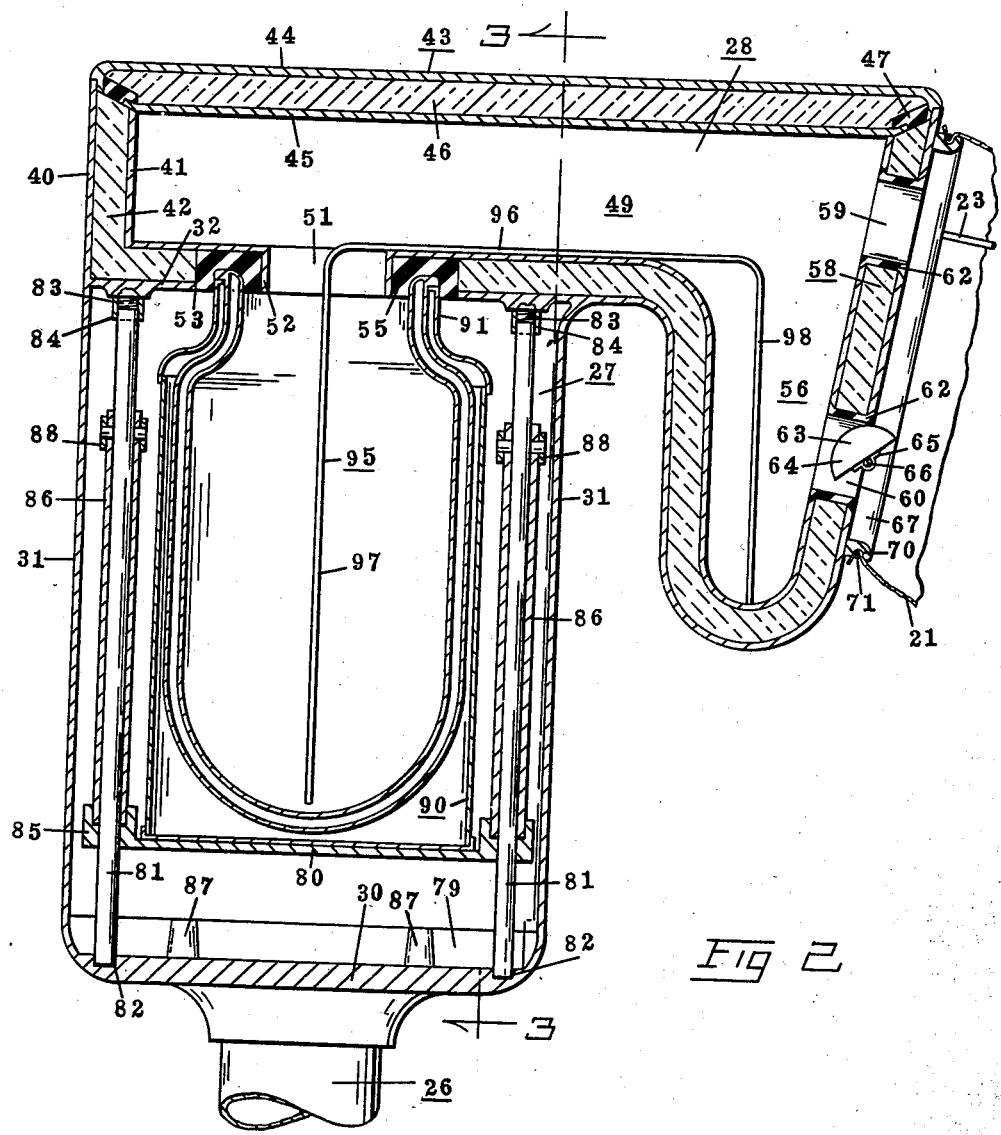
Fig. 2 is a view in section of the cabinet and mixing chamber of the air conditioning apparatus taken on line 2—2 of Fig. 3.
Figure 3:
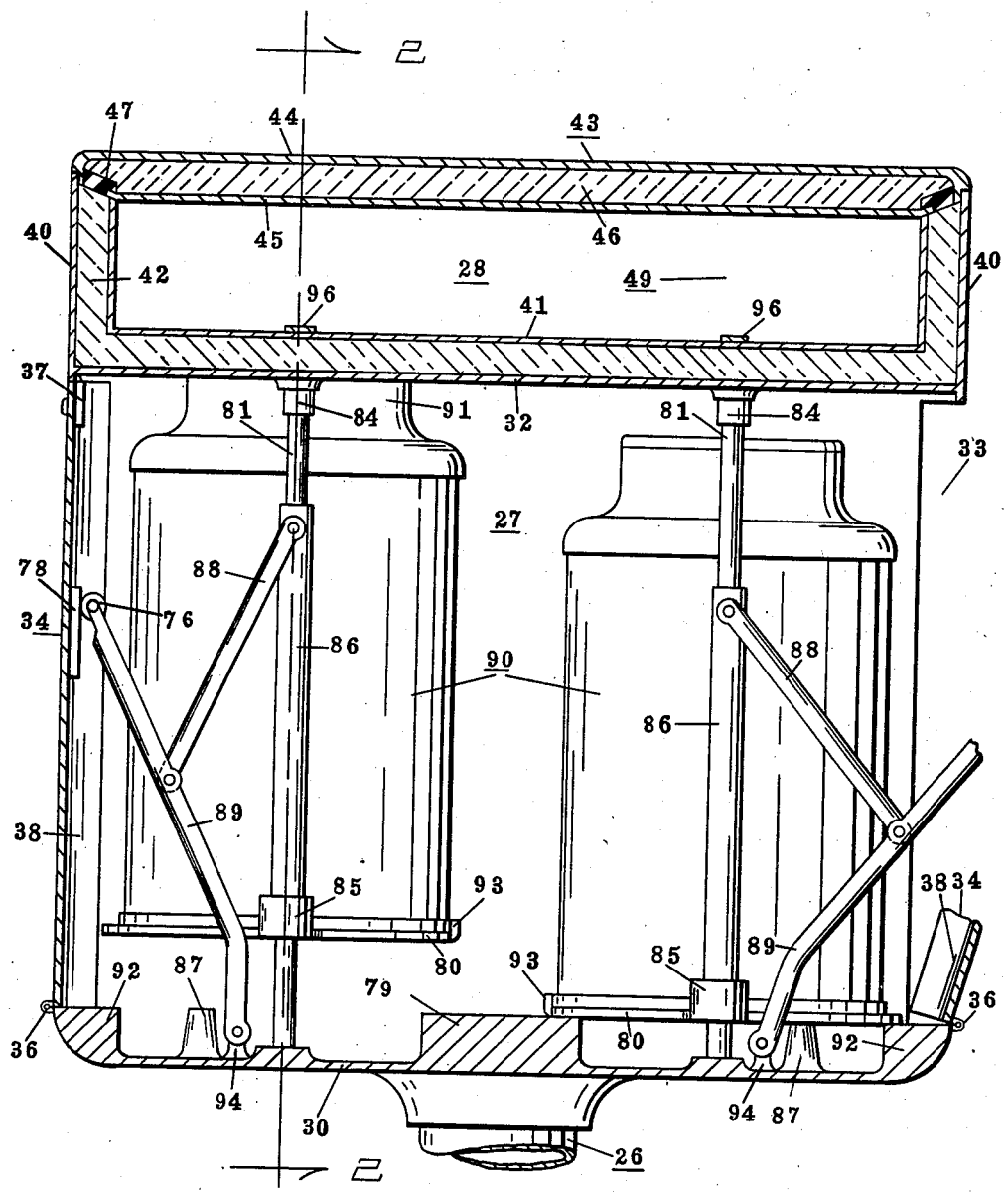
Fig. 3 is a view in section taken on line 3—3 of Fig. 2.

Referring to Figs. 1, 2 and 3, an apparatus 20 is shown for supplying cold oxygen gas and cold air to the interior of a tent 21. The tent is formed of transparent rubberized material, that is adapted to be supported over a person occupying a bed 22 by a hairpin shaped rod 23 suitably attached to an end wall of a cabinet 24. The cabinet 24 is supported by a standard 26 and includes a lower bottle or vessel containing section 27 and an upper insulated section 28.

The bottle section 27 is preferably fabricated of cast aluminum, having a bottom wall 30, two opposite side walls 31 and a horizontal wall 32. Two opposite sides of the cabinet are open as at 33, and are adapted to be covered by suitable doors 34. The doors 34 are hinged at the bottom to the cabinet by hinges 36, and conventional latches 37 are provided at the tops thereof for holding the doors closed. The side edges of the doors 34 are curved at 38 to fit the edges of the side walls 31.

The insulated section 28 is directly above the section 27 and has one end thereof extending beyond the sides of the section 27. The section 28 is formed by outer walls 40 and inner walls 41 having suitable insulation 42 disposed therebetween. The outer walls 40 are formed integrally with the side walls 31 of the section 27. The top of the section 28 is open and an insulating cover 43 is adapted to close the opening. The cover 43 is formed of two metal plates 44 and 45 having insulation 46 disposed therebetween and an insulating breaker strip 47 of soft rubber is disposed around the edges of the cover between the plates 34 and 35. Thus the section 28 forms a chamber 49. The partition between the section 27 and section 28 is provided with two openings 51 that are defined by necks 52 formed on the wall 41 that extend downwardly into openings 53 formed in the top wall 32 of the bottle section 27. Soft rubber collars 55 are disposed in the openings 53 between the insulation 42 and the necks 52.

The chamber 49 includes a pocket or mixing chamber portion 56 formed at the end which is disposed beyond the sides of the section 27. An end wall 58 of the section 28 is provided with two pairs of openings 59 and 60, only one opening of each pair appearing in the drawings. The openings 59 are above the openings 60 and are located with their centers in a horizontal plane. The lower openings 60 are also located with their centers in a horizontal plane. A rubber collar 62 is disposed in each of these openings. The openings 59 form gas inlets to the chamber 49 and the openings 60 form gas outlets for said chamber. A valve is disposed in each of the openings 60 and comprises a semi-spherical member 64 mounted by a strap 65 on a rod 66, which rod is journalled in flange 67 on the exterior of the wall 58. The rod 66 is provided with a suitable knob 68 for rotating the same to adjust the position of the valves 63.

The flange 67 which is formed on the outside of the end wall 58 surrounds the openings 59 and 60. The flange 67 is provided with a groove 70 formed therearound for receiving the edges of an open end of tent 21 and a rubber band 71 crowds the material of the tent into the groove, thereby forming a sealed connection. This method of connecting the tent to the apparatus is more fully set forth in my copending application Serial No. 150,594, filed June 26, 1937.

The standard 26 for the apparatus 20 includes a base 73 and telescoping tubular shafts 74 and 75, the former shaft being attached to base 73 and the latter shaft attached to the bottom wall of the cabinet 24. Preferably the shaft 74 is threaded and receives a nut 77 which latter when turned adjusts the height of the cabinet. It is also desirable to provide suitable casters (not shown) for the base 73 so that the apparatus may be readily moved about.

The bottle section 27 houses two movable platforms 80 and mechanism for raising and lowering the platforms when the doors 34 are closed and opened, respectively. Each of the platforms 80 is slidably mounted on two guide bars 81, which are supported vertically between the top and bottom walls of the cabinet and on opposite sides of the platforms. The lower ends of each of the bars 81 rest in a socket 82 formed in the bottom wall 30 and the upper end of each of the bars 81 is secured to a boss 83, formed on the top wall 32, by a threaded sleeve 84 that surrounds the end of the bar and is threaded on the boss 83. The platforms 80 are each provided with two brackets 85 on opposite sides that have openings formed therethrough for receiving the guide bars 81. A tube 86 is suitably secured in each of the openings in the brackets 85 and each is adapted to slide on a bar 81. A link 88 is attached to the upper end of each tube 86 which link is attached to a lever 89. Levers 89 are pivoted on legs 94 on the bottom wall 30 of bottle compartment 27, and the free end of the levers are adapted to extend outwardly through an opening 33 in the section 27 when the door 34 therefor is open. Two levers 89 are provided for each platform and on opposite sides thereof. The free ends of the levers 89 are each provided with a roller 76 for engaging one of the shoes 78. Two such shoes 78 are formed on each door 34.

The platforms 80 rest on a rib 79, bosses 87 and door sills 92 when the platforms are in their lowered positions. When a pair of the levers 89 are moved upwardly, as by a closing movement of a door 34, the links 88 raise the tubes 86 and a platform 80 is slid upwardly along the bars 81. When the door 34 is opened, the links 88 swing the levers 89 outwardly as the platform moves to its lowered position by gravity.

The platforms 80 each support a bottle or vessel 90. The vessels 90 are adapted to carry liquid air or liquid oxygen and are constructed similarly to the well known Dewar vessel. The necks 91 of the vessels 90 are depressed into the soft rubber collars 55 when the platforms are raised due to the closing of the doors 34.

In operation, the apparatus 20 is placed adjacent the head of the bed 22 with the extending or pocket end 56 of the section 28 over the head of the bed. The edge of the open end of the tent 21 is secured to the flange 67 as described above and the lower loose edge of the tent is tucked under the bed covering about the patient. A vessel 90 of liquid oxygen is inserted through one of the openings 33 and placed on a platform 80 and a vessel of liquid air is inserted through the other opening 33 and placed on the other platform. The platforms 80 are each provided with a lug 93 adjacent the periphery thereof for positioning the vessels 90 so that the necks 91 of the vessels will register with the respective openings 51. The doors adjacent the vessels are then closed and the platforms are raised thereby causing the necks 91 of the vessels to be pressed into the collars 55 to sealingly connect the vessels with the chamber 49.

Two or more U shaped strips 95, preferably of copper, are then placed in the apparatus through the open top of the chamber 49. The yokes 96 of the strips 95 rest on the top of inner bottom wall 41 of the section 28 and a leg 97 of one or more of the strips extends through the opening 51 into one of the vessels and a leg 97 of one or more of the other strips 95 extends through an opening 51 into the other vessel. The leg 98 of each strip extends into the pocket 56 of chamber 49. The cover 43 is then placed in position. The strips conduct heat from chamber 49 including pocket 56, to the liquid in the vessels 90. The cooled gas, falling within pocket 56, will flow through the outlet 60 into the tent and the warm gas with the noxious gases of respiration given off by the patient in the tent, flow into chamber 49 including pocket 56 through the inlets 59. The warm air and noxious gases are mixed in the pocket 56 with the cold air and oxygen boiling off of the liquids in the vessels 90. The rate of flow of the conditioned air into the tent may be controlled by the valves 63. The liquid gases in the vessels 90 cool the strips 95 to a very low temperature so that the noxious gases will condense and freeze on the strips. Likewise water vapors given off by the patient will condense and freeze on the strips. The proportions of vaporized air and oxygen gas desired in the mixture can be controlled by controlling the relative amount of heat conducted to the respective vessels of liquid air and liquid oxygen. This is accomplished by varying the width or the number of strips 95 associated with one of the vessels with respect to the width or number of strips 95 associated with the other vessel.

From the foregoing, it will be apparent, that the present invention provides structural improvements over my copending application previously mentioned. The probabilities of an attendant spilling cold liquid on the patient is substantially nil although the vessels are renewed while the conditioning apparatus is associated with the bed. Furthermore a delirious patient cannot, under any circumstances, upset the apparatus while he is in the bed. A pulling on the front end of the apparatus by a patient will merely cause the forward wall 31 of the apparatus to engage the rear of the head 99 of the bed 22. Thus the wall 31 functions as a guard to prevent upsetting of the apparatus.

The height of the apparatus has been minimized. This has been accomplished by providing the extending pocket section 56 and by spacing this pocket section from the bottle or vessel section 27 so that the space can receive the head of the bed. In other words, by this arrangement, the vessel section 27 can be disposed directly behind the head of the bed. Thus the center of gravity of the apparatus has been lowered with the consequent effect of lessening the possibility of upsetting the apparatus and furthermore, ease of removing the vessels and the conductor strips has been enhanced.

Any water vapors or noxious gases which reach the liquids in the vessel will freeze in the liquids and can be removed by a ladle. The strips 95 can be removed after cover 43 is removed when it is desirable to melt off frost formed by the frozen water vapor and frozen noxious gases.

Figure 4:
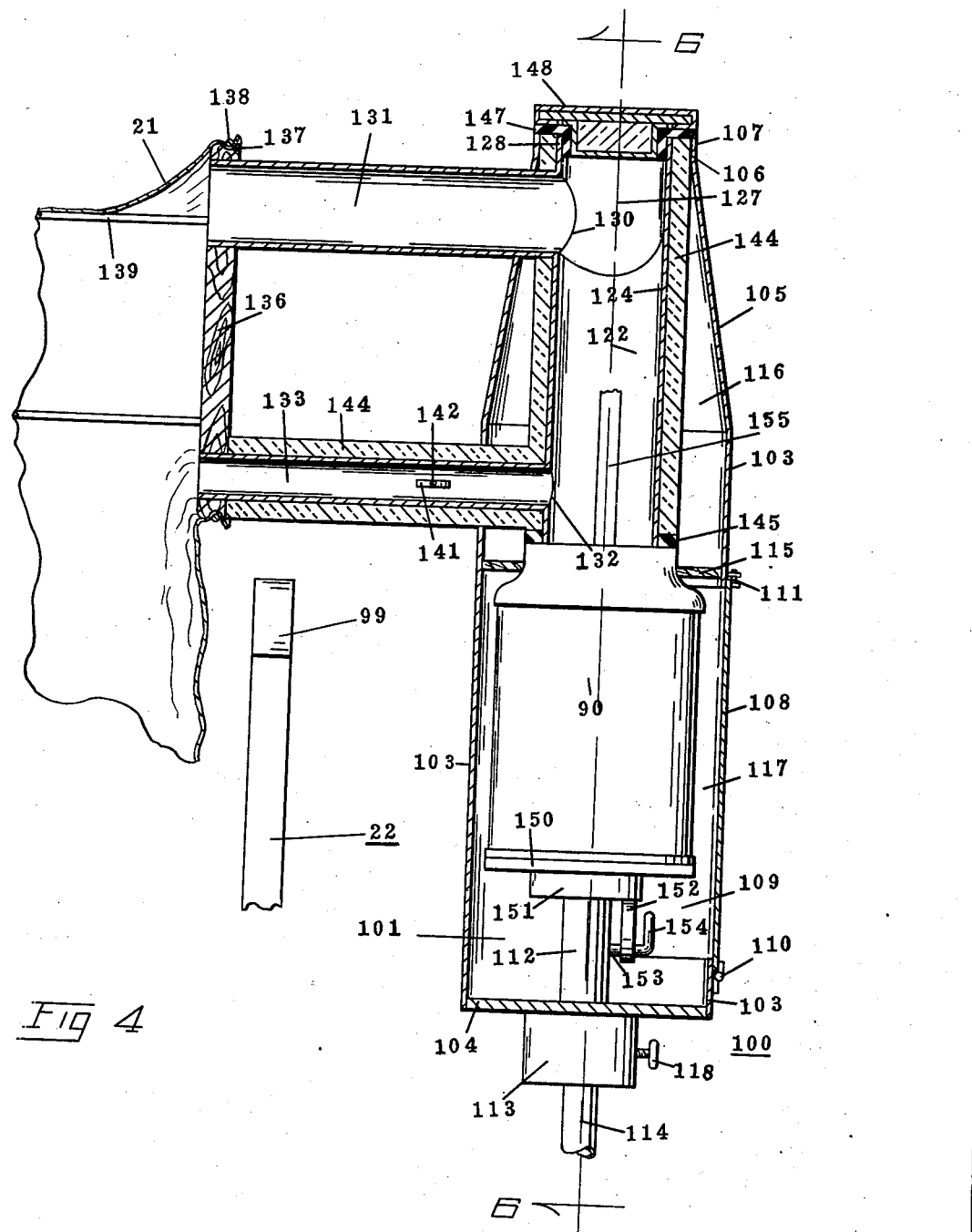
Fig. 4 is a view in section of another form of the air conditioning apparatus, taken substantially on line 4—4 of Fig. 6.
Figure 5:
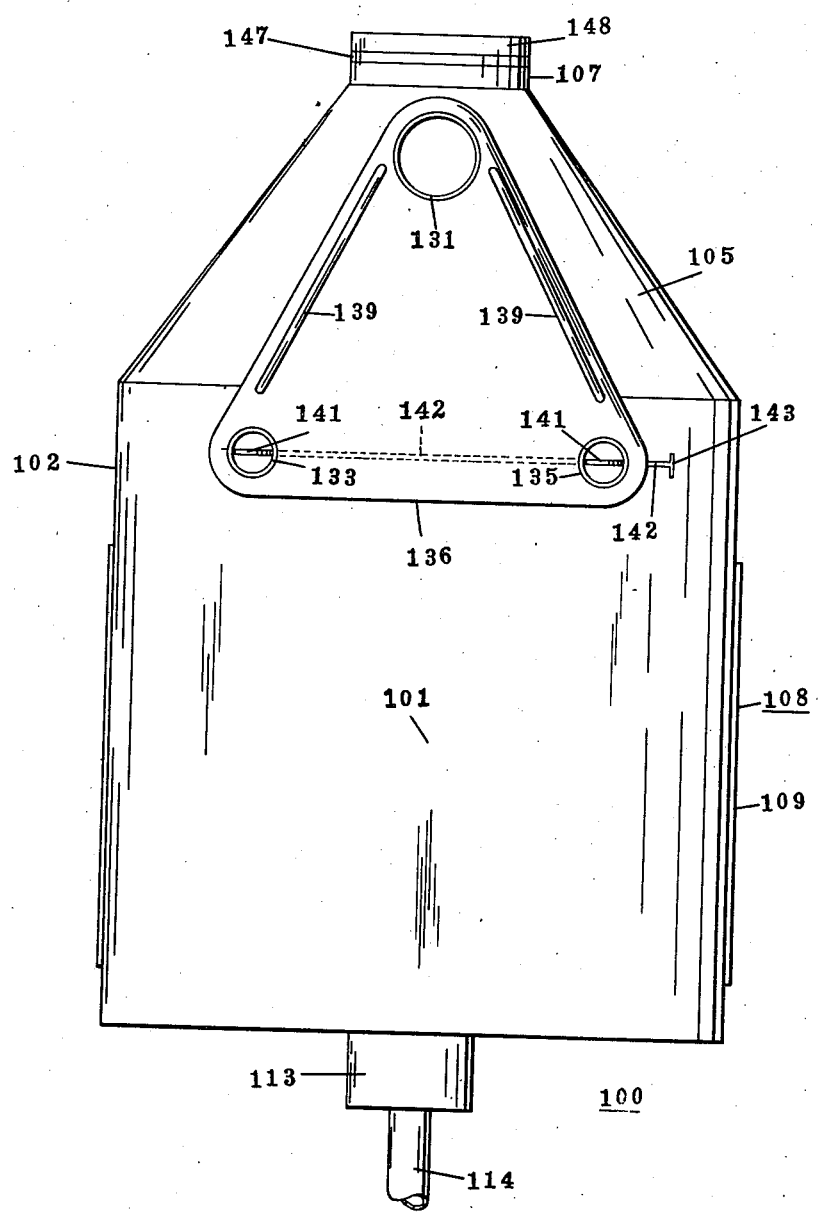
Fig. 5 is a front view of the apparatus shown in Fig. 4.
Figure 6:
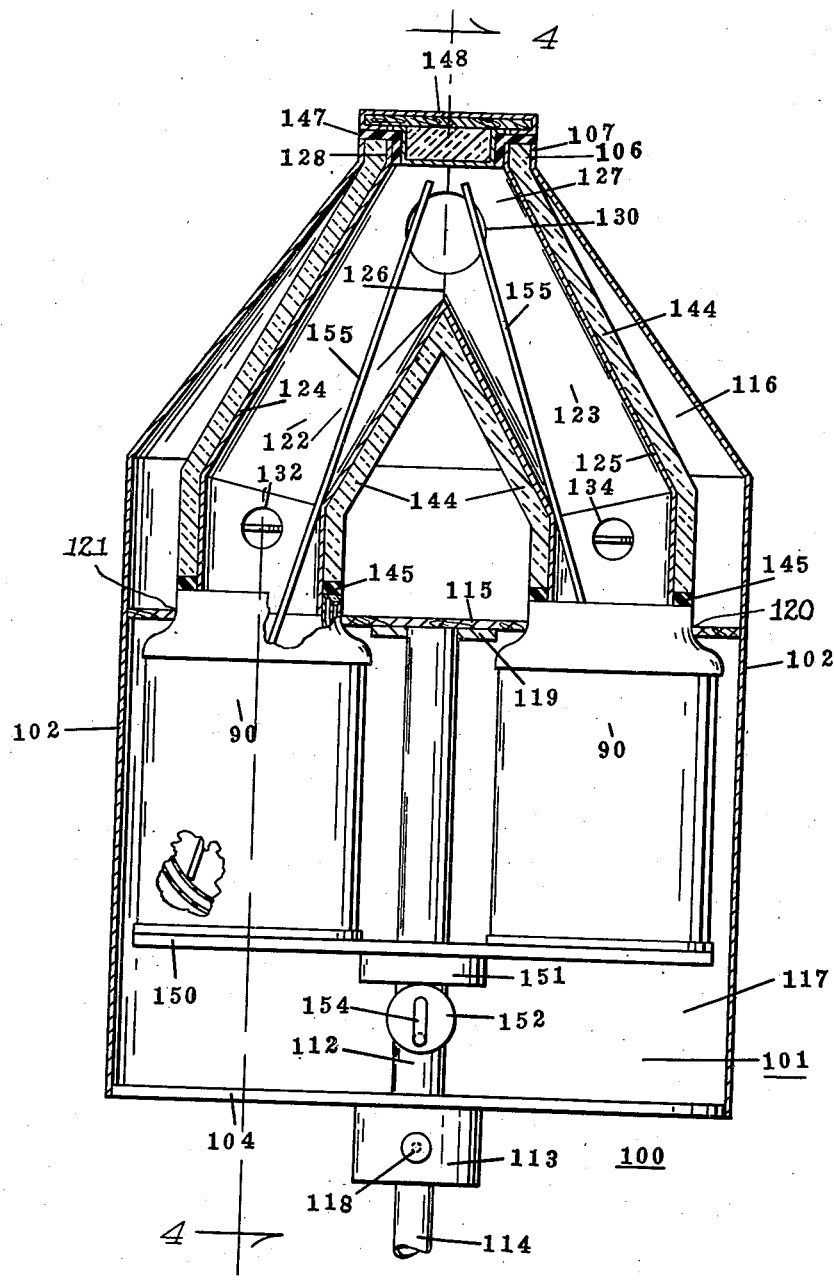
Fig. 6 is a view partly in section of the apparatus shown in Figs. 4 and 5, the section being taken on line 6—6 of Fig. 4.

Another embodiment of the invention is illustrated in Figs. 4, 5 and 6 wherein an air conditioning apparatus 100 is shown. This apparatus comprises a casing 101 formed of sheet metal having semi-circular end walls 102, front and back walls 103 and a bottom wall 104. The side walls taper upwardly as at 105, to form an opening 106 and a neck 107 is formed at the opening. An opening is formed in the casing that extends across the back wall 103 and half way around the end walls 102. A door 108, having curved side sections 109 that conform with the curved end walls 102, is hinged to the back wall 103 by suitable hinges 110 and is adapted to close the opening. The door 108 slightly overlaps the sides of the casing around the edges of the opening. A suitable latch 111 is provided for locking the door closed. A tubular shaft 112 extends upwardly into the casing 101 through an opening in the bottom wall 104. The bottom wall 104 rests upon a shoulder 113 formed on the lower end of shaft 112. The shaft 112 is supported on a tube 114 that is secured in a vertical position by a suitable base (not shown). The tube 114 is slidably fitted inside the shaft 112 and the collar 113 is provided with a lock screw 118 that is threaded in an opening in the collar for locking the collar at any desired position on the tube 114. Thus the height of the casing 101 may be adjusted. A partition 115 is suitably secured to the side walls 102 and 103 and extends across the casing for dividing the casing into an upper section 116 and lower section 117. The shaft 112 extends into a plate 119 which latter is suitably secured to the bottom of the partition 115, for stabilizing the casing 101. The partition 115 is provided with two openings 120 and 121.

Two chambers 122 and 123, formed by sheet metal tubes 124 and 125 respectively are suitably secured within the upper section 116 of the casing 101. The tubes 124 and 125 are joined together at 126, as by welding, and form an upper chamber 127 above the chambers 122 and 123. The upper part of chamber 127 merges into a neck 128 which is disposed inside the neck 107. An opening 130 is formed in the tubes 124 and 125 and a sheet metal tube 131 is connected to these tubes at the opening 130. The tube 124 is provided with an opening 132; a sheet metal tube 133 is connected to the tube 124 at the opening 132. The tube 125 is provided with an opening 134; a sheet metal tube 135 is connected to the tube 125 at the opening 134.

Tubes 131, 133 and 135 project over the head 99 of the bed and the outer ends thereof extend into and support a triangularly shaped plate 136. This plate 136 is formed preferably of insulating material, such as wood. The plate 136 is formed with a groove 137 therearound; the periphery edges of an open end of the tent 21 may be secured in the groove by an elastic band 138. Two hairpin shaped rods 139 are suitably connected to the face of the plate 136 and extend outwardly for supporting the tent 21 over the person occupying the bed 22. Thus the tubes 131, 133 and 135 may be connected with the interior of the tent 21. The tubes 133 and 135 are each provided with a damper valve 141. These valves are mounted on a rod 142 journaled in the walls of the tubes. The rod 142 carries a knob 143 by which the valves may be controlled.

The tubes 124, 125, 133 and 135 are covered with insulating material 144. The insulation 144 on the tubes 133 and 135 stops short of the lower ends of the tubes and soft, rubber collars 145 are secured around the tubes adjacent their lower ends.

An insulated breaker strip 147 is disposed around the inside of the neck 128 and over the end edges of the necks 107 and 128. An insulating cover 148 is adapted to fit into the neck 128 for sealing the chamber 127.

A movable platform 150 is provided in the lower section 117 of the casing 101 for supporting two of the vessels 90. The platform 150 is provided with an opening through the center thereof and a collar 151 is connected to the underside of the platform around the opening. The shaft 112 extends through the collar and platform and the platform is movable in a vertical direction along the shaft. The collar 151 closely fits the shaft 112 so that the shaft will stabilize the platform. A cam 152 is mounted on a rod 153 rotatively connected to the shaft 112. The collar 151 rides on the periphery of the cam. A handle 154 is formed on the rod 153 for rotating the cam. Thus the cam, when rotated, will raise and lower the platform 150.

In operation, the apparatus 100 is placed adjacent the bed 22 with the tubes 131, 133 and 135 and the plate 136 extending over the head of the bed. The edge of an open end of the tent 21 is secured around the plate 136 as described above, and the other edge of the open end of the tent is tucked under the bed covering about the patient. Vessels 90 of liquid oxygen and of liquid air are placed on the platform 150, when it is in its lowered position, and in register with the ends of the tubes 124 and 125 respectively. The cam 152 is then rotated so that the platform is raised, to the position shown in Figs. 4 and 6. The raising of the platform 150 presses the upper edges of the vessels 90 against the collars 145 and over the ends of the tubes 124 and 125. Strips 155 of copper or some suitable heat conducting material are inserted through the opening 146 in the top of the casing 101. The strips 155 rest on the bottoms of the vessels 90 and extend upwardly through the chambers 122 and 123 and into the chamber 127.

The warm air rising in the tent 21, enters the tube 131 and strikes the strips 155. The strips 155 and the metal tubes 124 and 125 are chilled by the liquid oxygen and liquid air so that the incoming air is cooled and descends into the chambers 122 and 123 and flows out the openings and tubes 133 and 135 into the tent 21. The strips 155 conduct heat, from the incoming air, to the liquid in the vessels 90, and the liquids volatilize and flow upwardly into the chambers 122 and 123 and mix with the air from the tent. The mixed gases then flow out of the chambers into the tent through the tubes 133 and 135. The strips 155 are chilled to the extent that noxious gases of respiration and water vapors entering the chambers 127, 122 and 123 are condensed and frozen on the strips and thereby removed from circulation. The relative rate of volatilization of the liquid oxygen and liquid air is controlled by varying the number or the sizes of strips 155 placed in the respective vessels.

In the present embodiment of the invention, the oxygen gas emanating from the liquid oxygen is mixed with other gases circulating through the apparatus and tent in one of the chambers for example chamber 122 and the air, emanating from the liquid air is mixed with other gases circulating through the apparatus in the other chamber for example chamber 123. The rate of flow of the gases through the tent may be controlled by the damper valves 141.

While the forms of embodiments of the present invention as herein disclosed constitute preferred forms, it is to be understood that other forms might be adopted, all coming within the scope of the claims which follow.

I claim:

1. A gas conditioning apparatus, comprising in combination, means forming a chamber in which gas to be conditioned is circulated; a vessel containing a volatile liquid disposed outside of said chamber, said chamber and vessel having openings registering with one another; and heat conducting means in heat exchange relation with the gas in the chamber and with the liquid in the vessel.

2. A gas conditioning apparatus, comprising in combination, means forming a chamber in which gas to be conditioned is circulated, said chamber having an opening; a vessel containing a volatile liquid and having an opening, the vessel being disposed outside of the chamber; means connecting the vessel and chamber with the openings registering with one another; and heat conducting means in heat exchange relation with the gas in the chamber and with the liquid in the vessel.

3. In a gas conditioning apparatus, means forming a chamber; a vessel containing a volatile liquid disposed below said chamber, said chamber and vessel having openings registering with one another; means forming a housing for the vessel, said housing including an entranceway for the vessel and a door for the entranceway; and means operated by the movement of the door for causing relative movement in a vertical direction between the first named means and the vessel for interconnecting the openings.

4. In a gas conditioning apparatus, a base, means forming a chamber carried by the base and having an opening; a housing carried by the base; vessel means containing volatile liquid disposed within the housing, said vessel and chamber having openings adapted to register with one another, said housing having an opening for the insertion and removal of the vessel, and including a door therefor; and mechanism actuated by the door for moving one of the aforementioned means relative to the other for causing the chamber and vessel to be interconnected through the openings therein.

5. In a gas conditioning apparatus, means forming a chamber having an opening; a vessel containing a volatile liquid disposed below the chamber and having an opening registering with the opening in the chamber, said chamber including a downwardly extending pocket, the wall forming the pocket being open for the ingress and egress of gas; and heat conducting means between the pocket and the liquid in the vessel.

6. In a gas conditioning apparatus, means forming a chamber having an opening; a vessel containing a volatile liquid disposed below the chamber and having an opening registering with the opening in the chamber, said chamber including a downwardly extending pocket, the wall forming the pocket being open for the ingress and egress of gas; and a removable heat conductor extending into the pocket and into the vessel.

7. In a gas conditioning apparatus, in combination with a bed having a head; means forming a chamber above and to the rear of the head of the bed and a pocket disposed in front of the head of the bed, said pocket being open for the ingress and egress of air, said chamber having an opening in the rear of the head of the bed; and a vessel containing volatile liquid disposed below the chamber and at the rear of the head of the bed and having an opening registering with the opening in the chamber.

8. In a gas conditioning apparatus, in combination with a bed having a head; means forming a chamber above and to the rear of the head of the bed and a pocket disposed in front of the head of the bed, said pocket being open for the ingress and egress of air, said chamber having an opening rearwardly of the head of the bed; a vessel containing volatile liquid disposed below the chamber and at the rear of the head of the bed and having an opening registering with the opening in the chamber; and means forming a guard between the head of the bed and the vessel.

9. In a gas conditioning apparatus, in combination with a bed having a head; means forming a gas passage over and forwardly and rearwardly of the head of the bed, the forwardly extending portion being open for the ingress and egress of air and the rearwardly extending portion having an opening; and a vessel containing volatile fluid disposed below the passage and at the rear of the head of the bed and having an opening registering with the opening in said rearwardly extending portion.

10. In a gas conditioning apparatus, means forming a plurality of mixing chambers, each having an opening in the lower part thereof, said chambers having openings for the ingress and egress of gas; means forming passages extending laterally from the chambers and connected with the latter openings, one of said passages being common to both chambers; and vessels containing volatile liquid disposed below the chambers and each having an opening registering with one of the first mentioned openings in the chambers.

11. In a gas conditioning apparatus, means forming a plurality of mixing chambers, each having an opening in the lower part thereof, said chambers having openings for the ingress and egress of gas; means forming passages extending laterally from the chambers and connected with the latter openings, one of said passages being common to both chambers; vessels containing volatile liquid disposed below the chambers and each having an opening registering with one of the first mentioned openings in the chambers; and a heat conductor extending from one of the vessels to the chamber directly associated therewith.

12. A gas conditioning apparatus, comprising in combination, means forming a chamber in which respiration is carried on; a vessel containing a volatile liquid disposed outside of said chamber, the boiling point of the liquid being below the condensaton temperature of a gas forming a constituent of the gases of respiration, said chamber and vessel having openings registering with one another; and heat conducting means in heat exchange relation with gas in the chamber and with the liquid in the vessel.

FRANK W. HARTMAN.